(12) United States Patent
Eberhardt et al.

(10) Patent No.: US 9,559,614 B2
(45) Date of Patent: Jan. 31, 2017

(54) GRID-CONNECTED INVERTER, INVERTER ARRANGEMENT AND METHOD FOR OPERATING AN INVERTER ARRANGEMENT

(71) Applicant: SMA Solar Technology AG, Niestetal (DE)

(72) Inventors: Thomas Eberhardt, Bad Hersfeld (DE); Josef Petschenka, Kassel (DE); Christopher Krause, Bad Wuennenberg (DE); Christian Landau, Baunatal (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 685 days.

(21) Appl. No.: 14/025,944

(22) Filed: Sep. 13, 2013

(65) Prior Publication Data
US 2014/0015326 A1    Jan. 16, 2014

Related U.S. Application Data

(63) Continuation of application No. PCT/EP2012/054617, filed on Mar. 15, 2012.

(30) Foreign Application Priority Data

Mar. 16, 2011    (DE) .................. 10 2011 001 305

(51) Int. Cl.
*H02M 7/5387*  (2007.01)
*H02J 3/38*  (2006.01)
*H02M 7/493*  (2007.01)

(52) U.S. Cl.
CPC .......... *H02M 7/53873* (2013.01); *H02J 3/383* (2013.01); *H02M 7/493* (2013.01); *Y02E 10/563* (2013.01); *Y10T 307/707* (2015.04)

(58) Field of Classification Search
USPC .................................................... 307/85, 82
See application file for complete search history.

(56) References Cited

U.S. PATENT DOCUMENTS

| 5,642,020 | A  | 6/1997 | Miyazaki et al. |
| 8,217,533 | B2 | 7/2012 | Jones et al. |

(Continued)

FOREIGN PATENT DOCUMENTS

| DE | 19701191 A1 | 7/1997 |
| DE | 69420665 T2 | 12/1999 |

(Continued)

OTHER PUBLICATIONS

International Search Report dated Aug. 21, 2013 in connection with International Application No. PCT/EP2012/054617.

(Continued)

*Primary Examiner* — Joseph Chang
(74) *Attorney, Agent, or Firm* — Eschweiler & Associates, LLC

(57) ABSTRACT

A grid-connected inverter for feeding current via a transformer into an electric power grid includes an output bridge arrangement that is actuated via a pulse width modulator, wherein a periodic auxiliary signal is used to determine switching times of the output bridge arrangement. The inverter also includes a synchronization unit for phase synchronization of the auxiliary signal with the electric power grid, wherein the synchronization unit is configured to set a predetermined phase offset ($\Delta\Phi_0$) of the periodic auxiliary signal with respect to a phase of the electric power grid.

14 Claims, 6 Drawing Sheets

(56) References Cited

U.S. PATENT DOCUMENTS

| | | |
|---|---|---|
| 2008/0265680 A1 | 10/2008 | Marwali et al. |
| 2008/0284252 A1 | 11/2008 | Jones et al. |
| 2010/0156188 A1 | 6/2010 | Fishman |
| 2010/0320837 A1 | 12/2010 | Harrison |
| 2014/0252863 A1* | 9/2014 | Patel ..................... H02J 3/44 307/82 |

FOREIGN PATENT DOCUMENTS

| | | |
|---|---|---|
| EP | 1995863 A2 | 11/2008 |
| JP | 6152114 A | 3/1986 |
| JP | 2006149119 A | 6/2006 |
| WO | 2009062227 A1 | 5/2009 |

OTHER PUBLICATIONS

Chih-Chiang Hua, et al.; "Parallel Operation of Inverters for Distributed Photovoltaic Power Supply System"; Department of Electrical Engineering, National Yunlin University of Science and Technology; 2002 IEEE; p. 1979-1983.

Zhiling Qui, et al.; "Study and Design of Grid Connected Inverter for 2 MW Wind Turbine"; College of Electrical Engineering, Zhejiang University; 2007 IEEE; p. 165-170.

International Preliminary Report on Patentability Dated Nov. 5, 2013 International Application No. PCT/EP2012/054617.

* cited by examiner

GRID-CONNECTED INVERTER, INVERTER ARRANGEMENT AND METHOD FOR OPERATING AN INVERTER ARRANGEMENT

REFERENCE TO RELATED APPLICATIONS

This application is a continuation of International Application PCT/EP2012/054617, filed on Mar. 15, 2012, that claims priority to German Patent Application DE 2011 001 305.9, filed on Mar. 16, 2011, the contents of which are hereby incorporated by reference in their entirety.

FIELD

The disclosure relates to a grid-connected inverter for feeding current into an electric power grid via a transformer, wherein the inverter comprises an output bridge circuit that is actuated via a pulse width modulator, wherein a periodic auxiliary signal is used to determine switching times of the output bridge arrangement. The disclosure furthermore relates to an arrangement comprising at least two such inverters and a method for operating such an inverter arrangement.

BACKGROUND

Grid-connected inverters are used in energy supply systems, for example photovoltaic systems and wind energy installations. In grid-connected inverters, a voltage or current profile output at the output of the inverter follows the corresponding profile of the electric power grid. In the energy supply systems, generators, for example photovoltaic modules connected in series and/or parallel, generate a DC voltage, which is supplied to a DC voltage intermediate circuit, possibly after a change in voltage by a step-up converter. Direct current from the DC voltage intermediate circuit is converted into an alternating current that is suitable in terms of its frequency and voltage for feeding into the electric power grid by the inverter. This conversion can take place into a single-phase or multiphase alternating current, in particular three-phase alternating current. In this case, the inverter comprises an output bridge circuit which comprises one or more switching bridges which are generally equipped with power semiconductor switches, depending on the number of phases of the electric power grid into which it is intended to be fed in.

In this case, the power semiconductor switches are actuated in accordance with a specific modulation pattern in such a way that, in combination with filters which are arranged between the inverter and the electric power grid, an output current is generated which is as sinusoidal as possible. In pulse width modulation methods (PWM), which are often used, the power semiconductor switches are switched on and off with a switching frequency that is considerably higher than the frequency of the AC voltage in the electric power grid (for example a switching frequency of 3 to 30 kHz in comparison with a mains frequency of 50 or 60 Hz). Over the course of a period of the system frequency, in this case the ratio between the switch-on time and the switch-off time within a switching frequency period, referred to as the duty factor, is changed in such a way that a profile of the output current as sinusoidal as possible is provided. Known configurations for determining the duty factors or the switching times are, for example, the "sine-triangle modulation method", the "space vector modulation method" (SVM) or modified sine-triangle modulation methods, for example the so-called "third-harmonic sine-triangle modulation method". In these PWM methods, a periodic auxiliary signal, for example a triangular signal in the "sine-triangle modulation method" or a clock signal in the "SVM method" is used for determining the switching times.

Even in the case of relatively complex modulation methods, however, the AC voltage generated is typically not a purely sinusoidal signal, but shows, for example, frequency components at the switching frequency of the modulation method, which are referred to as voltage ripples.

In order to achieve relatively high output currents or powers, in particular in the case of relatively large photovoltaic systems, often two or more inverters are used in parallel. When these inverters are not completely isolated from one another on the output voltage side, compensation currents can occur between the inverters, which result in undesirable additional current loading for the power semiconductor switches of the output bridge circuit of the inverters. Such output currents occur, for example, when inverters are connected to one another both on the DC voltage side via a common intermediate circuit and on the AC voltage side, for example since they are connected directly to the electric power grid without a transformer interposed. On the DC voltage side, coupling can also be provided when no common intermediate circuit is used, but the modules or strings (a series connection of modules) are each grounded with one connection. On the AC voltage side, problematic mutual influencing of two inverters can also be provided via an inductive coupling. In a case of inductive coupling of two inverters, no DC compensation currents flow, but compensation currents with AC components at relatively high frequencies may flow, in particular due to the above-described voltage ripples which are not entirely avoidable during the inversion. Such a coupling can also be observed in installations in which transformers are arranged between the inverters and the electric power grid.

The document DE 10 2008 056 256 A1 shows an inverter arrangement having a plurality of inverters connected in parallel, in which compensation currents between the inverters can be avoided by virtue of the fact that corresponding power semiconductor switches of the individual inverters are actuated at the same time. This is achieved in that one of the inverters, referred to as the master inverter, generates actuation signals for the power semiconductors which are transmitted via corresponding lines to each of the further inverters, which are referred to as slave inverters. However, this method is only practicable in the case of inverters that are arranged physically close to one another.

Document US 2008/0265680 A1 describes an arrangement of a plurality of inverters that are coupled directly with their outputs. The inverters are controlled by PWM methods, wherein the auxiliary signals used in the process are synchronized using a grid voltage. As a result, transmission of actuation signals for the output bridge arrangement of the inverters is not necessary. The electric power grid is used as a synchronization connection. The method is well suitable for directly interconnected inverters. In the case of inverters that are coupled inductively, for example via transformers, however, it has been demonstrated that compensation currents are not completely suppressed.

SUMMARY

In one embodiment the present disclosure provides an arrangement of inverters and a method for operating an arrangement of inverters in which inverters that are coupled to one another inductively via a transformer on the AC side can be operated without problematic compensation currents occurring and without transmission of actuation signals for the output bridge arrangement of the inverters being necessary. The disclosure also provides a grid-connected inverter suitable for this purpose.

In accordance with one embodiment a grid-connected inverter is disclosed for feeding current into an electric power grid via a transformer, the inverter having an output bridge arrangement that is actuated via a pulse width modulator, wherein a periodic auxiliary signal is used to determine switching times of the output bridge arrangement. Furthermore, the inverter comprises a synchronization unit for phase synchronization of the auxiliary signal with the electric power grid. The inverter is characterized in that the synchronization unit is designed to set a predetermined phase offset of the periodic auxiliary signal with respect to a phase of the electric power grid.

By virtue of the phase synchronization of the auxiliary signal with the electric power grid, the switching times of two inverters can be matched to one another, with the result that no compensation currents flow, wherein the phase offset makes it possible for phase shifts occurring within the transformer to be compensated for. As a result, even in the case of inductively coupled inverters, synchronization can take place over the electric power grid without the necessity for transmitting additional signals, e.g., actuation signals for the output bridge arrangement of the inverters or synchronization signals, over a separate line.

In an advantageous embodiment of the inverter, the synchronization unit comprises a PLL (phase lock loop) circuit. In this way, synchronization of the auxiliary signal with the electric power grid can take place in a simple manner, although the auxiliary signal generally has a frequency which is a multiple higher than the electric power grid.

In accordance with another embodiment an inverter arrangement is disclosed comprising at least two such grid-connected inverters, which are coupled to one another on the AC side. The same advantages result as in the first aspect, in particular a separate line for additional synchronization signals between the inverters can be omitted.

In a configuration of the inverter arrangement, the inverters are coupled inductively to one another on the AC side via a three-winding transformer. Three-winding transformers are considerably less complex and less costly than conventional four-winding transformers. The often disadvantageous low impedance between the two primary windings in three-winding transformers is unproblematic owing to the use of the inverters in accordance with the first aspect. In this case, the impedances of the primary windings can also be different, since asymmetries can be compensated for by the method applied.

In another embodiment of the present disclosure, an operating method for an inverter arrangement for feeding power into an electric power grid with at least two grid-connected inverters is provided, wherein the inverters are coupled to one another on the AC side by at least one transformer and each inverter comprises an output bridge arrangement that is actuated in pulse-width-modulated fashion using a periodic auxiliary signal, wherein the respective periodic auxiliary signal is phase-synchronized with the electric power grid. The operating method is characterized in that the periodic auxiliary signals of the two coupled inverters have a predetermined non-zero phase offset with respect to one another. The advantages in turn correspond to those of the first and second aspects.

BRIEF DESCRIPTION OF THE DRAWINGS

The disclosure will be illustrated below with reference to seven figures in example embodiments. In the figures.

DETAILED DESCRIPTION

Figure 1:
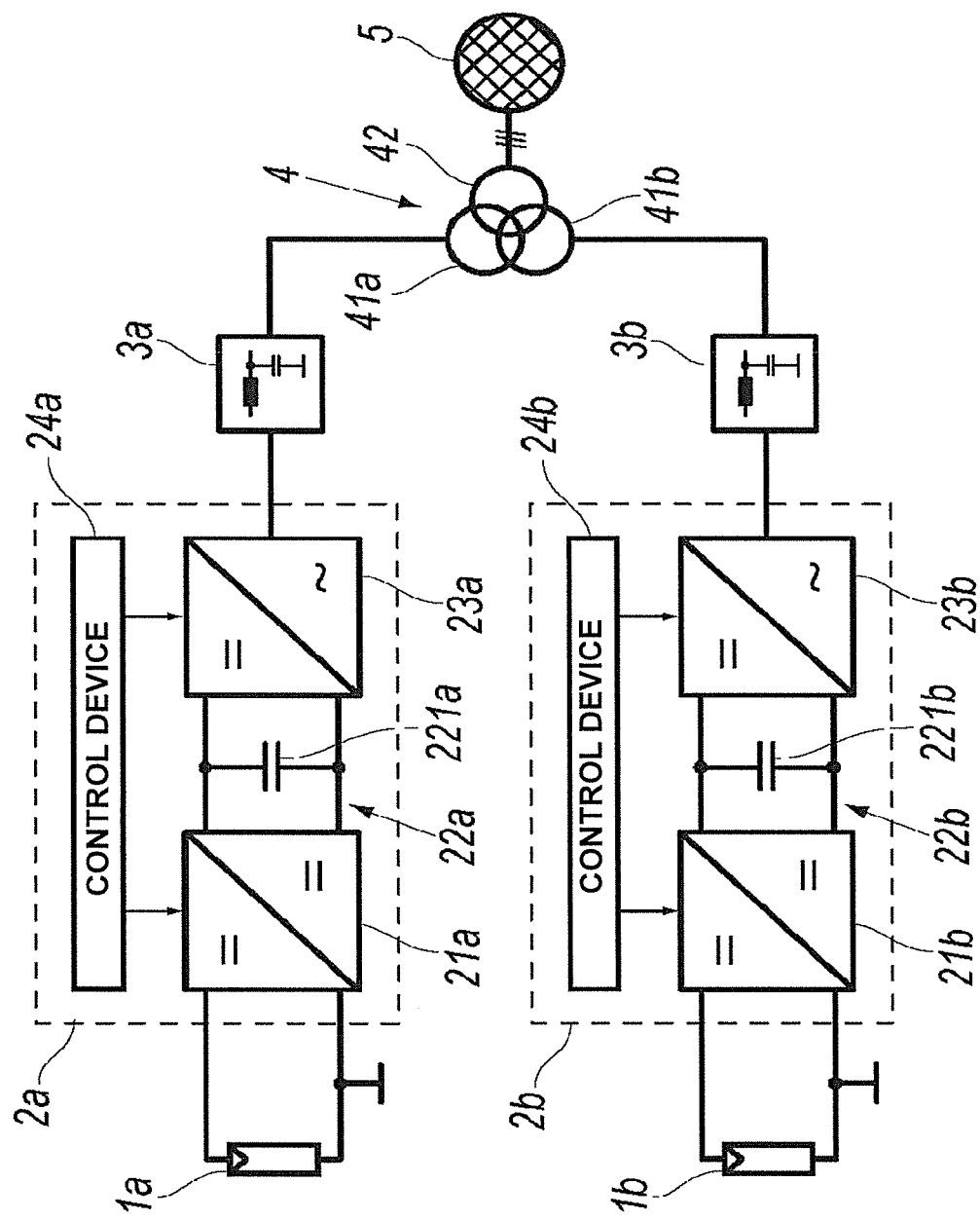
FIG. 1 shows a schematic block circuit diagram of an energy supply device with two inverters.

FIG. 1 depicts a photovoltaic system as energy supply system in a schematic block circuit diagram. The photovoltaic system, referred to as PV system below for short, comprises two photovoltaic generators (PV generators) $1a$, $1b$, which are each connected to an inverter $2a$, $2b$. The output of the inverters are connected to a transformer 4 via a filter $3a$, $3b$, respectively. The transformer 4 comprises two separate primary windings $41a$, $41b$ for this purpose. A common secondary winding 42 of the transformer 4 is connected to an electric power grid 5 for feeding the electrical power, which has been generated by the PV generators $1a$, $1b$ and has been converted in the inverters $2a$, $2b$, into the electric power grid.

The PV generators $1a$, $1b$ are in each case illustrated only by the circuit symbol for an individual photovoltaic cell symbolically in the figure. Needless to say that the PV generators $1a$, $1b$ can be constructed with an embodiment of the PV system illustrated in each case from a plurality of photovoltaic modules (PV modules), which are connected to one another in series and/or in parallel. For reasons of clarity further elements of PV systems, for example DC-side switching elements or AC-side switching elements, for example disconnectors or fuse elements, are not depicted in the figure.

In the illustrated embodiment of the disclosure, the inverters $2a$, $2b$ each comprise an input-side DC-to-DC converter $21a$, $21b$, which is connected in each case to a DC-to-AC inverter $23a$, $23b$ via an intermediate circuit $22a$, $22b$. It is noted that an inverter in accordance with the application can also be constructed without an input-side DC-to-DC converter. In each case a capacitor $221a$, $221b$ is arranged in the intermediate circuit, wherein the capacitor is used for smoothing the intermediate circuit voltage Uz and enabling a pulsed current withdrawal without voltage dips in the intermediate circuit voltage Uz by virtue of the DC-to-AC inverter $23a$, $23b$. The inverters $2a$, $2b$ each have a control device $24a$, $24b$ for controlling the DC-to-DC converters $21a$, $21b$ and the DC-to-AC inverters $23a$, $23b$. The control of the DC-to-DC converters $21a$, $21b$ may in this case also comprise a so-called MPP (Maximum Power Point) tracking method, for example, which is used for operating the PV generators 1*a*, 1*b* at a maximum power working point.

The PV system is designed for feeding electric power into the electric power grid 5 on three phases. Correspondingly, the inverters 2*a*, 2*b* have a three-phase output, and the filters 3*a* and 3*b* and the transformer 4 are designed for three phases. The number of three phases should be understood to be merely an example; an inverter in accordance with the application and an inverter arrangement constructed therewith can likewise be suitable for operation with any desired number of phases, in particular single-phase operation.

The inverters 2*a*, 2*b* have output bridge circuits with semiconductor power switches in their DC-to-AC inverters 23*a*, 23*b*, the semiconductor power switches being actuated in a PWM method. The output signal of the DC-to-AC inverters 23*a*, 23*b* is therefore a clocked DC signal, wherein the clock frequency, i.e. the number of switching cycles per second, can be in the range of one kilohertz to a few 10 kilohertz. The filters 3*a*, 3*b*, which comprise a combination of inductive and capacitive elements, are used for smoothing the output signal of the inverters 2*a*, 2*b* to give a voltage profile which is as sinusoidal as possible. For this reason, they are often also referred to as sine-wave filters.

Figure 2:
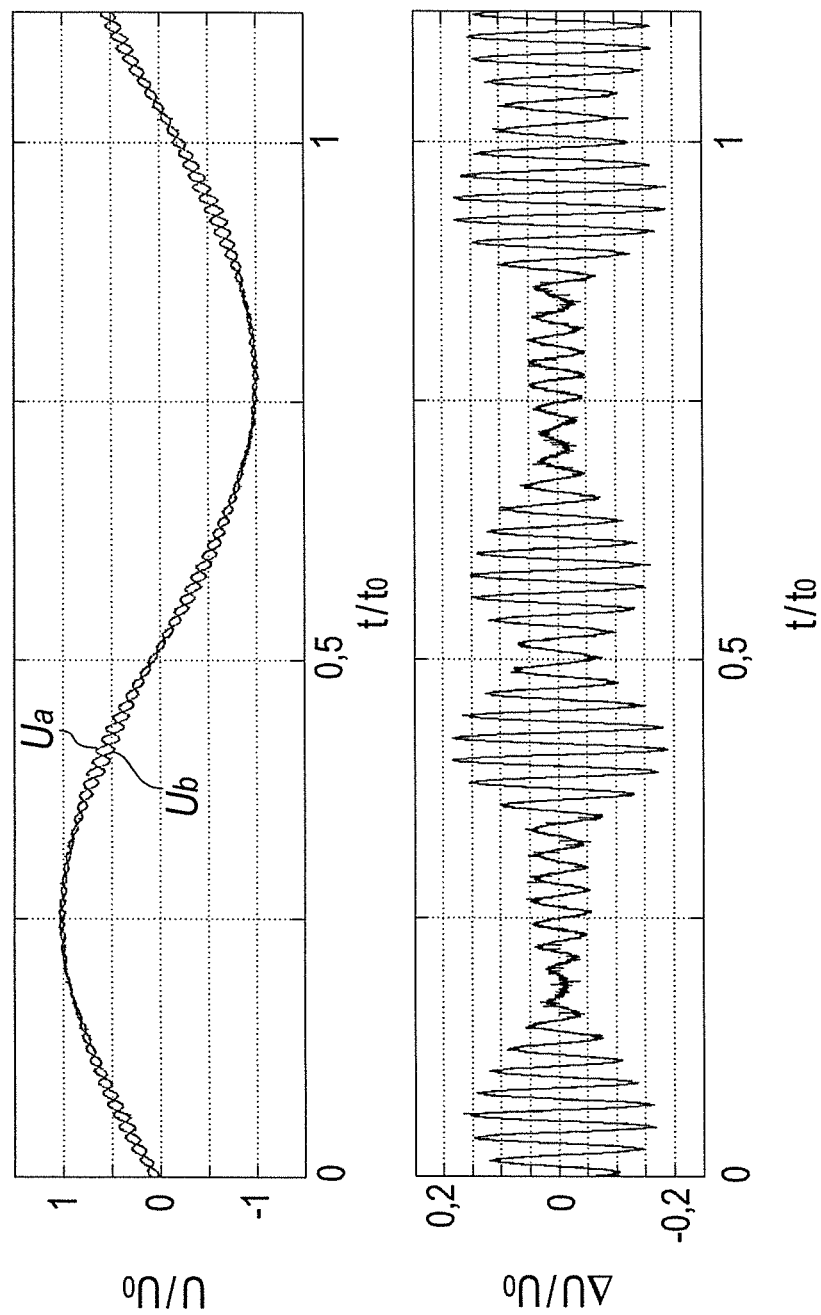
FIG. 2 shows a representation of output voltages over time of the two inverters from the example embodiment shown in FIG. 1 in the unsynchronized case.

FIG. 2 shows, in its upper part, the voltages $U_a$ and $U_b$ at the output of the filters 3*a*, 3*b* normalized to an amplitude voltage U0 as a function of time t. The figure illustrates the profile of a period of a phase of the electric power grid 5 with a period length t0. FIG. 2 shows non-synchronized operation of the inverters 2*a*, 2*b*. The profiles of the voltages $U_a$, $U_b$ both show a component with a relatively high frequency which is superimposed on the purely sinusoidal profile. In terms of its amplitude, this component equates to a few percentage points of the amplitude voltage $U_0$. These components with a relatively high frequency are also referred to as voltage ripples.

In the lower part of FIG. 2, a differential voltage $\Delta U = U_b - U_a$ is illustrated on the same time axis as in the upper part of the figure. With respect to the voltage axis, the lower part of the figure is illustrated in enlarged form in comparison with the upper part of the figure. The profile of the voltage difference $\Delta U$ which fluctuates about the zero point shows that the two inverters 2*a*, 2*b* uniformly follow the voltage profile of the electric power grid 5 with respect to the sinusoidal fundamental. A differential voltage $\Delta U$ other than zero can be observed with the voltage ripples, however. During operation of the PV system, this differential voltage $\Delta U$, owing to inductive coupling of the currents in the primary windings 41*a*, 41*b* of the transformer 4, result in compensation currents at the frequency of the voltage ripples which flow back and forth between the capacitors in the filters 3*a*, 3*b*. This can be observed in particular when a so-called three-winding transformer is used as the transformer 4, which three-winding transformer has a lower impedance between the two primary windings than other suitable transformers, for example the so-called four-winding transformers.

Figure 3:
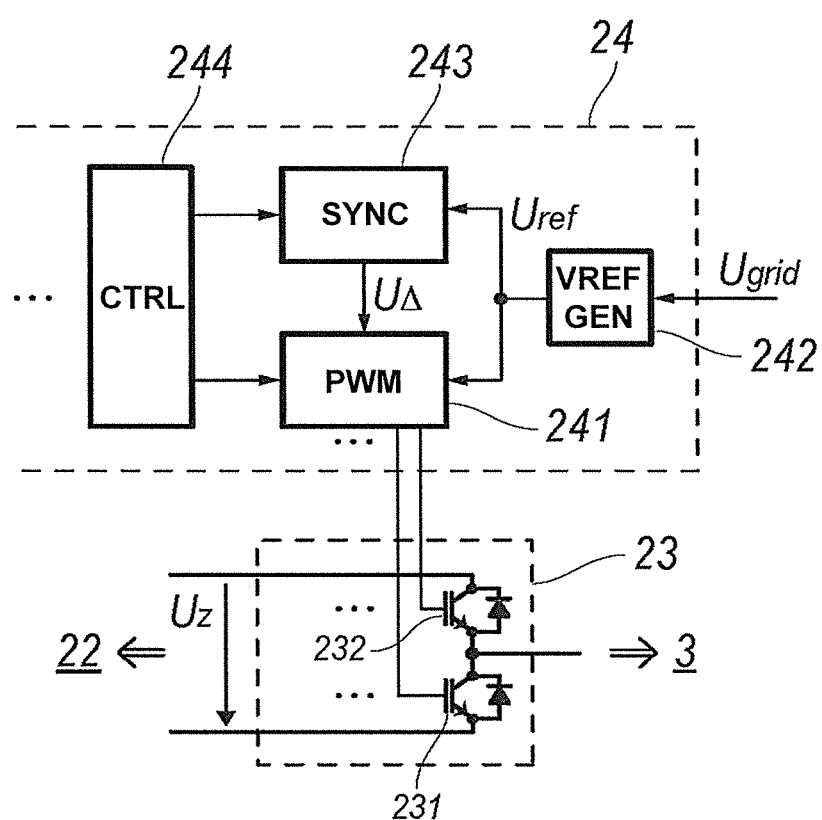
FIG. 3 shows part of an inverter in a schematic overview illustration in a schematic block circuit diagram.

FIG. 3 shows a detail of one of the inverters 2*a*, 2*b* from FIG. 1, likewise in a block circuit diagram. The following statements relate to both inverters 2*a*, 2*b* which have an identical construction in the example embodiment illustrated. Therefore, no distinction is drawn using the index a, b in the reference symbols.

The DC-to-AC inverter 23 of the inverter 2 comprises an output bridge arrangement, of which one bridge branch is illustrated symbolically. In the case of a three-phase embodiment of the inverter 2, generally three such bridge branches are provided, which are indicated by the ellipses in the figure. Each bridge branch comprises two semiconductor power switches 231, 232. By way of example, IGBTs (Insulated-Gate Bipolar Transistors) are illustrated, each IGBT is provided with a protection diode connected back-to-back in parallel (anti-parallel). However, other suitable semiconductor switches, for example MOSFETs (Metal Oxide Semiconductor Field-Effect Transistors) can also be used. The switches 231, 232 are actuated by the control device 24. The control device comprises a pulse width modulator (PWM) 241, a reference voltage generator (VREF GEN) 242, a synchronization unit (SYNC) 243 and a control unit (CTRL) 244.

The pulse width modulator 241 generates the actuation signals for the switching elements 231, 232 in such a way that a predetermined profile of a reference voltage $U_{ref}$ is reproduced. The reference voltage $U_{ref}$ is formed by the reference voltage generator 242 from a grid voltage profile supplied thereto of the electric power grid 5. Therefore, the voltage profile output at the output of the inverter 2 follows that of the grid voltage; the inverter is grid-connected. The reference voltage generator 242 can, in order to provide the reference voltage $U_{ref}$, map the voltage of one of the phases of the electric power grid, referred to below as the grid voltage $U_{grid}$, onto a lower voltage level of the reference voltage $U_{ref}$. The mapping can take place directly or, alternatively, by using an intermediate reference voltage sine-wave generator that is synchronized with the predetermined grid voltage $U_{grid}$ via a phase lock loop (PLL).

The pulse width modulator 241 in the example embodiment illustrated is a triangle-sine wave modulator. With this type of modulation, a triangular signal $U_A$ is used as periodic auxiliary signal for determining the switching points of the switches 231, 232. The frequency of the triangular signal $U_A$ is a multiple of the frequency $f_0$ of the grid voltage $U_{grid}$. In the example embodiment illustrated, the triangular signal $U_A$ used as periodic auxiliary signal is generated by the synchronization unit 243. The controller 24 having the pulse width modulator 241 and synchronization unit 243 are arranged within (i.e., integral to) each respective, individual inverter and dedicated for operation with its respective inverter so that a plurality of inverters can be used in a group inverter arrangement. In such an arrangement, each inverter derives its own timing signal without a need to exchange any synchronization timing information with the other inverters directly in a master/slave type relationship or via a single external controller, such as would be necessary with a plurality of inverters that interface with a single external controller.

Figure 4:
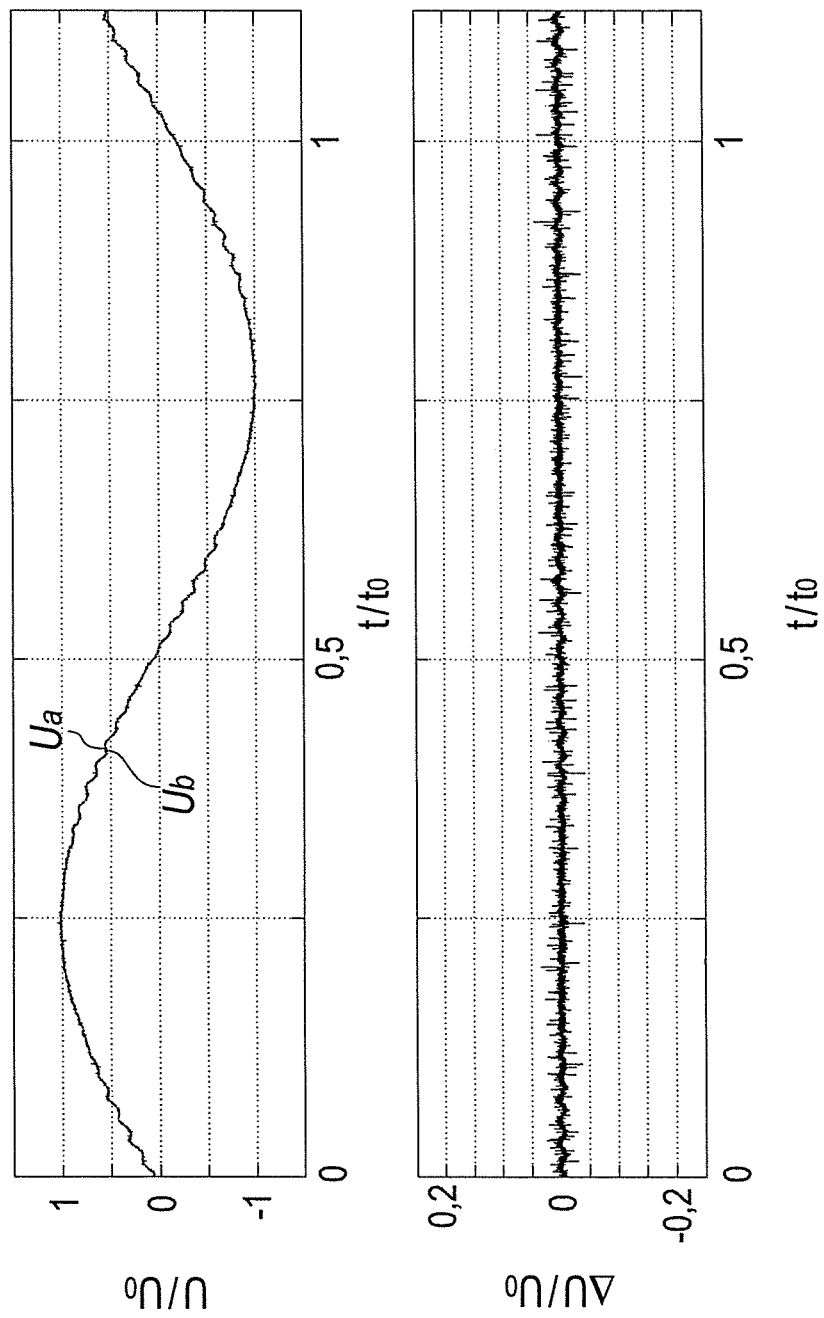
FIG. 4 shows a representation of output voltages over time in the case of inverters which are not coupled inductively in a synchronized case.

FIG. 4 shows, in the same way as FIG. 2, output voltages $U_a$ and $U_b$ of two inverters, whose respective auxiliary signal has been adjusted to an identical phase angle in respect of the voltage profile of one of the phases of an electric power grid. It can be seen in the upper part of FIG. 4 that the voltage profiles $U_a$ and $U_b$ are congruent on the scale illustrated. This is confirmed by the representation of the differential voltage $\Delta U = U_b - U_a$ in the lower part of the figure, in which only a minimum discrepancy with respect to the zero line can be seen. Disadvantageous compensation currents which would occur in the case of direct coupling of the outputs are therefore no longer or virtually no longer present during synchronization of the triangular signal $U_A$ with the same phase angle.

If, however, the inverters are not coupled directly, but are coupled inductively as in the example embodiment in FIG. 1, such a synchronization with a common phase angle over one of the phases in the electric power grid cannot prevent AC compensation currents from flowing.

In accordance with the method according to the application for operating an inverter arrangement, a predetermined phase relationship between the periodic auxiliary signal, in this case the triangular signal $U_A$, and the grid voltage $U_{grid}$, represented by the reference voltage $U_{ref}$, for the inverters of the inverter arrangement is adjusted in such a way that the auxiliary signals of two coupled inverters can have a predetermined phase offset $\Delta\Phi_0$ other than zero with respect to one another. In the example embodiment described here, this is performed by the synchronization unit 243.

Figure 5:
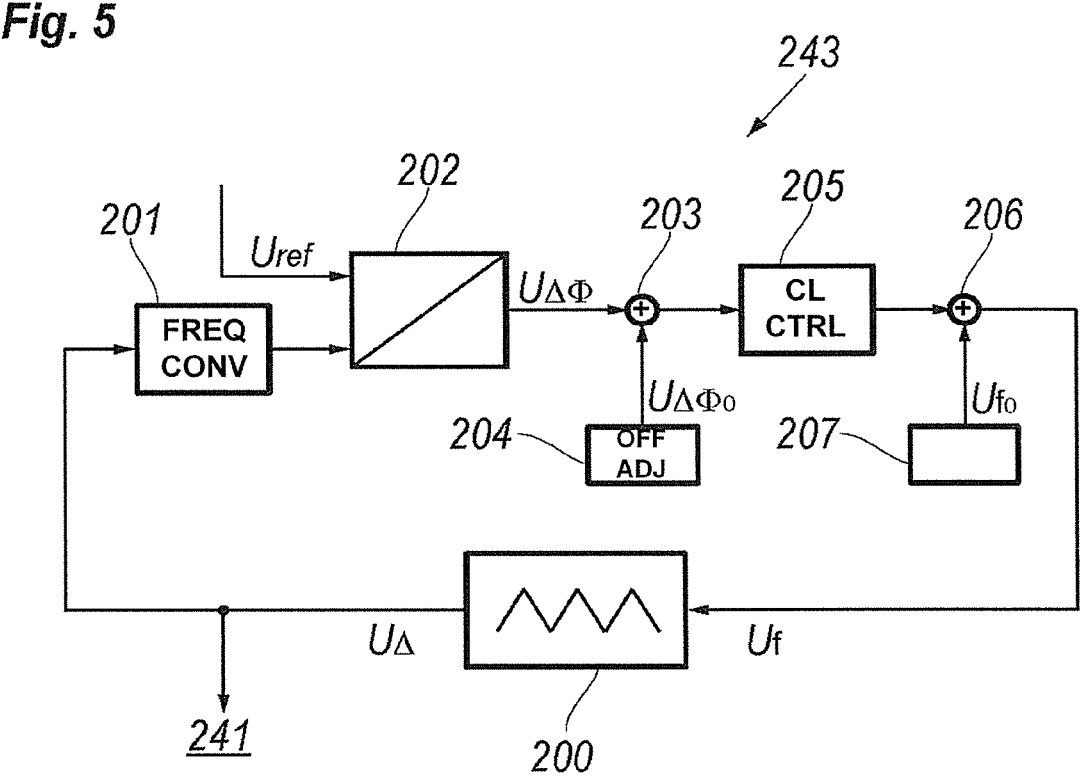
FIG. 5 shows a synchronization device which can also be used for inductively coupled inverters for an inverter in a schematic block circuit diagram.

FIG. 5 shows the structure of the synchronization unit 243 from FIG. 3 in more detail in a block circuit diagram. It is noted in advance that FIG. 5 illustrates a synchronization unit with an analog control loop for the phase angle of the auxiliary signal for the PWM. Needless to say that the synchronization unit can likewise have digital closed-loop control.

The synchronization unit comprises a triangular voltage generator 200, which is in the form of a voltage-controlled frequency generator whose frequency f is controlled via an input voltage signal $U_f$. The voltage signal output by the triangular voltage generator 200 at an output is provided as triangular signal $U_A$ to the pulse width modulator 241.

Within the synchronization unit, the triangular signal $U_A$ is supplied to a frequency converter (FREQ CONV) 201. The frequency f of the triangular signal $U_A$ is generally an integral multiple of the mains frequency $f_0$ of the electric power grid 5. The frequency ratio $f/f_0$ between the two frequencies is, in one embodiment, in the range of approximately 10 to 100. In order to perform a comparison of the phase angles of the triangular signal $U_A$ and the lower-frequency grid voltage profile, the frequency converter 201 implements frequency division of the triangular signal $U_A$ by the factor, and waveform conversion into a sinusoidal signal. One possibility for the conversion includes installing a ring counter with a counter content incremented by the value 1 per passed-through period of the triangular signal $U_A$. If the counter reaches a count which corresponds to the frequency ratio $f/f_0$, the counter is reset to an initial value of 1. The counter thus passes cyclically through $f/f_0$ different values, wherein each cycle run corresponds to a period duration of the sinusoidal signal of the grid voltage $U_{grid}$. A conversion table is stored in the frequency converter 201, in which a corresponding value for a sinusoidal voltage with the period duration of the mains frequency $f_0$ is stored for each count. A voltage signal generated by means of a digital-to-analog converter is output in accordance with the values in this table at the output of the frequency converter 201. Thus, the frequency converter 201 provides a sinusoidal voltage signal at its output, which sinusoidal voltage signal is coupled, with a phase lock, to the triangular signal $U_A$ of the triangle-wave generator 200 and corresponds in terms of its frequency to the grid voltage $U_{grid}$. This signal is likewise supplied to a phase comparator 202, in the same way as the reference signal $U_{ref}$ which is provided by the reference generator 242 and is phase-locked with respect to the grid voltage. A signal $U_{\Delta\Phi}$ is output at the output of the phase comparator 202, which signal is proportional to the phase difference between the two input signals. A voltage generated by an offset adjuster (OFF ADJ) 204 and which corresponds to a phase offset $\Delta\Phi_0$ to be adjusted is also added to this signal in an adder 203. The total signal is supplied to a closed-loop control module (CL CTRL) 205 as controlled variable, the closed-loop control module possibly being in the form of a proportional-integral controller (PI controller). The output of the closed-loop control module 205 is added in a further adder 206 to a fundamental voltage $U_{f0}$, which is output by a fundamental frequency adjuster 207 in order to generate the control voltage $U_f$, which controls the frequency f of the triangle-wave generator 200, as described at the outset.

The synchronization unit 243 thus comprises a phase lock loop (PLL), by means of which the frequency f of the triangle-wave generator 200 is continuously adjusted via the closed-loop control module 205 in such a way that a fixed phase relationship between the triangular signal $U_A$ and the reference voltage $U_{ref}$ prevails. This phase relationship can in this case be adjusted via the offset adjuster 204 or else predetermined by a control device. The frequency ratio $f/f_0$ between the triangular signal $U_A$ and the grid voltage $U_{grid}$ is determined via the frequency divider 201 and the conversion table stored therein. In this case, the input of the fundamental voltage $U_{f0}$ by the fundamental frequency adjuster should be matched correspondingly, with the result that the fundamental is already as close as possible to the operating frequency of the triangle-wave generator 200 even when the control loop is switched on.

A method for determining a phase offset $\Delta\Phi_0$ will now be described with reference to FIGS. 6 and 7, said method preventing compensation currents from flowing owing to voltage ripples on the output voltage of the inverters in the case of inductive coupling of two inverters.

Figure 6:
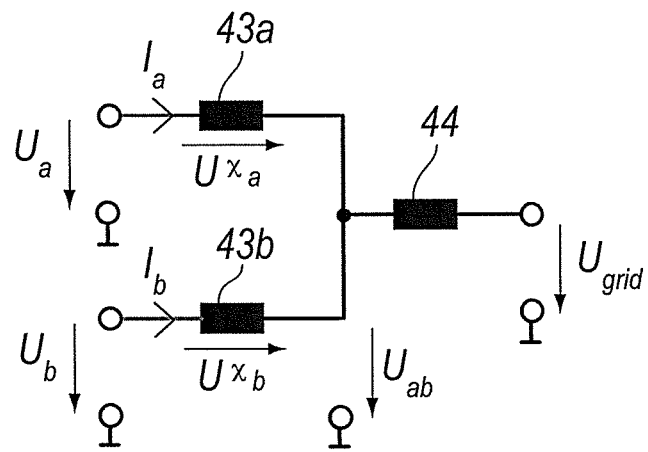
FIG. 6 shows a simplified equivalent circuit diagram of a three-winding transformer.

FIG. 6 shows in this respect a simplified equivalent circuit diagram of the three-winding transformer 4 from the example embodiment in FIG. 1. In this simplified equivalent circuit diagram, both nonreactive resistors of the primary windings 41a, 41b and the secondary winding 42 and the main inductance of the transformer 4 are not taken into consideration.

The stray inductances 43a, 43b of the primary windings 41a and 41b, respectively, which are relevant for the inductive coupling and a stray inductance 44 of the secondary winding 42 are specified. The voltages $U_a$ and $U_b$ are present at the inputs of the transformer 4 which are connected to the stray inductances 43a, 43b. The grid voltage $U_{grid}$ is correspondingly present at the stray inductance 44. Furthermore, FIG. 6 indicates the currents $I_a$ and $I_b$ flowing at the inputs and a voltage $U_{ab}$ which is applied to the node between the stray inductances 43a, 43b and 44.

During operation of the transformer 4 illustrated, the currents $I_a$, $I_b$ in conjunction with the reactances of the stray impedance 43a, 43b result in a voltage drop $U^x{}_a$ and $U^x{}_b$ across the stray impedances 43a, 43b.

Compensation currents between the inverters are prevented when the corresponding input voltages $U_a$ and $U_b$ and the corresponding voltage drops $U^x{}_a$ and $U^x{}_b$ are added to give the same node voltage $U_{ab}$ in each of the sub branches from the input of the transformer 4 up to the node, i.e. when $U_a - U^x{}_a = U^x{}_b \; U^x{}_b$, wherein it is necessary to take into consideration the fact that the input voltages and the voltage drops across the stray impedances 43a, 43b are perpendicular to one another in a complex representation.

Figure 7:
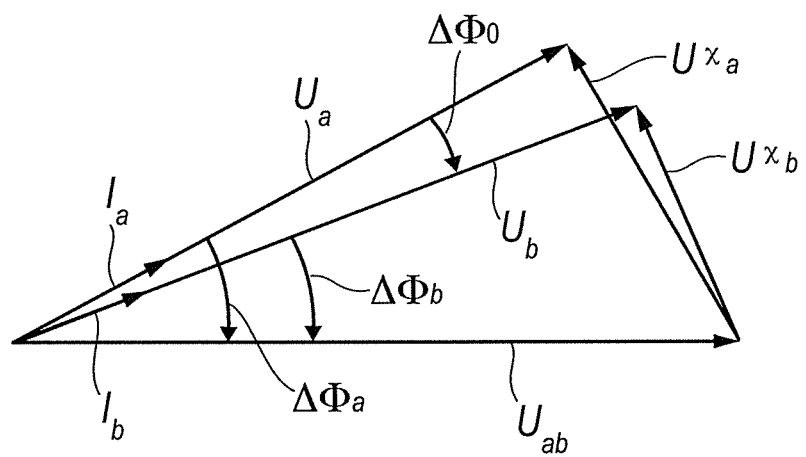
FIG. 7 shows a phasor diagram relating to the equivalent circuit diagram illustrated in FIG. 6.

In FIG. 7, this condition is reproduced in the form of a phasor diagram. The voltage drops $U^x{}_a$ and $U^x{}_b$ result in phase differences $\Delta\Phi_a$ and $\Delta\Phi_b$ of the input voltage $U_a$ and $U_b$ with respect to the node voltage $U_{ab}$. The phase shifts $\Delta\Phi_a$, $\Delta\Phi_b$ are generally different since the magnitude of the voltage drops $U^x{}_a$ and $U^x{}_b$ is also different. This results as a product of the current $I_a$ or $I_b$ and the reactance of the respective stray inductance 43a or 43b. The reactance is in turn proportional to the magnitude of the inductance value of the stray inductance 43a, 43b for the predetermined mains frequency. By way of summary, this means that, firstly, the power fed by an inverter determines the magnitude $I_a$, $I_b$, and secondly the properties of the transformer 4 are responsible for the phase differences $\Delta\Phi_a$ and $\Delta\Phi_b$. With respect to the transformer 4, in particular the differences in the properties of the individual windings 41a, 41b associated with the inverters are relevant. Feeding power into the electric power grid without any compensation currents flowing between the inverters is achieved when a phase offset of $\Delta\Phi_0 = \Delta\Phi_a - \Delta\Phi_b$ is adjusted between the output voltages $U_a$ and $U_b$.

In this case, besides the properties of the transformer, the electrical properties of a connection path between the inverter and the transformer can also be taken into consideration in order to compensate for the influences of the properties on phase differences. In this sense, possibly relevant properties of the connection path are the impedances of connecting lines and/or of interposed filters, for example.

Large photovoltaic power stations are often constructed from a plurality of PV systems as shown in FIG. 1. As previously described, the inverters 2 of each PV system are synchronized in order to avoid compensation currents. Advantageously, when interconnecting a plurality of PV systems at a mains connection point of the electric power grid 5, however, the PV systems are each synchronized in pairs in such a way that their respective voltage ripples are, as far as possible, in phase opposition (phase shift of 180°) and therefore the voltage ripples are mutually canceling. In the synchronization unit 243 shown in FIG. 5, this can also take place via the offset adjuster 204. The inverters of a first PV system are operated in the same phase with a specific phase offset $\Delta\Phi_0$ in respect of their triangular voltage $U_A$, and the inverters of a second PV system are operated in turn with a specific phase offset $\Delta\Phi'_0$ with respect to one another in respect of their triangular voltage $U_A$, wherein there is a phase offset of approximately 180° between the inverters of the first and second PV systems, however.

In an alternative configuration, in a photovoltaic power station with a plurality of PV systems as described above, the inverters 2 of each PV system are synchronized in such a way that their outputs give voltage ripples with the same profile. The individual PV systems are operated with predetermined phase offsets $\Delta\Phi_0$ other than zero which are preferably different and are distributed as uniformly as possible over the entire phase space (0 to $2\pi$ or 0-180°), however. This configuration is suitable in particular for photovoltaic power stations which comprise an uneven number of PV systems.

The invention claimed is:

1. A grid-connected inverter for feeding current via a transformer into an electric power grid, comprising:
    an output bridge arrangement that is actuated via a pulse width modulator, wherein a periodic auxiliary signal is used to determine switching times of the output bridge arrangement; and
    a synchronization unit for phase synchronization of the auxiliary signal with the electric power grid,
    wherein the synchronization unit is configured to set a predetermined phase offset ($\Delta\Phi_0$) of the periodic auxiliary signal with respect to a phase of the electric power grid, and
    wherein the synchronization unit is integral to the grid-connected inverter and dedicated for operation with the grid-connected inverter.

2. The grid-connected inverter as claimed in claim 1, wherein the pulse width modulator comprises a sine-triangle modulator, and the periodic auxiliary signal is a triangular signal.

3. The grid-connected inverter as claimed in claim 1, wherein the synchronization unit comprises a PLL circuit.

4. The grid-connected inverter as claimed in claim 3, wherein the PLL circuit comprises a frequency converter with a conversion table and a digital-to-analog converter for converting the periodic auxiliary voltage into a phase-locked sinusoidal voltage with a low frequency.

5. An inverter arrangement comprising at least two grid-connected inverters, which are coupled inductively to one another on an AC side, wherein each inverter comprises:
    an output bridge arrangement that is actuated via a pulse width modulator, wherein a periodic auxiliary signal is used to determine switching times of the output bridge arrangement; and
    a synchronization unit for phase synchronization of the auxiliary signal with the electric power grid,
    wherein the synchronization unit is configured to set a predetermined phase offset ($\Delta\Phi_0$) of the periodic auxiliary signal with respect to a phase of the electric power grid, and
    wherein the synchronization unit is integral to the grid-connected inverter and dedicated for operation with the grid-connected inverter.

6. The inverter arrangement as claimed in claim 5, wherein the inverters are coupled to one another on the AC side via a three-winding transformer.

7. The inverter arrangement as claimed in claim 6, wherein the three-winding transformer comprises two primary windings with different impedances.

8. An operating method for an inverter arrangement for feeding power into an electric power grid with at least two grid-connected inverters that are coupled to one another on an AC side via at least one transformer, each of the inverters comprising an output bridge arrangement that is actuated in a pulse-width-modulated fashion using a periodic auxiliary signal, wherein the respective periodic auxiliary signal is phase-synchronized with the electric power grid via each of the at least two inverters, comprising establishing a predetermined phase offset ($\Delta\Phi_0$) other than zero between the periodic auxiliary signals of the two coupled inverters.

9. The operating method as claimed in claim 8, wherein the established phase offset ($\Delta\Phi_0$) is dependent on a power fed by the inverter into the electric power grid.

10. The operating method as claimed in claim 8, wherein the established phase offset ($\Delta\Phi_0$) is dependent on a magnitude of an inductance and/or a resistance of a winding of the transformer which is connected to the inverter.

11. The operating method as claimed in claim 8, wherein the established phase offset ($\Delta\Phi_0$) is dependent on a magnitude of an inductance and/or a resistance of a connecting path between the inverter and the transformer.

12. The operating method as claimed in claim 8, wherein at least four grid-connected inverters are provided that are coupled to one another in pairs of two on the AC side, wherein the predetermined non-zero phase offsets ($\Delta\Phi_0$) of the periodic auxiliary signals are different for the inverters that are each coupled to one another in pairs on the AC side and the inverters that are not coupled to one another.

13. The operating method as claimed in claim 12, wherein the periodic auxiliary signals of inverters that are not coupled to one another are in phase opposition.

14. The operating method as claimed in claim 12, wherein the periodic auxiliary signals of all of the inverters that are not coupled to one another have different phase offsets ($\Delta\Phi_0$).

* * * * *